UNITED STATES PATENT OFFICE.

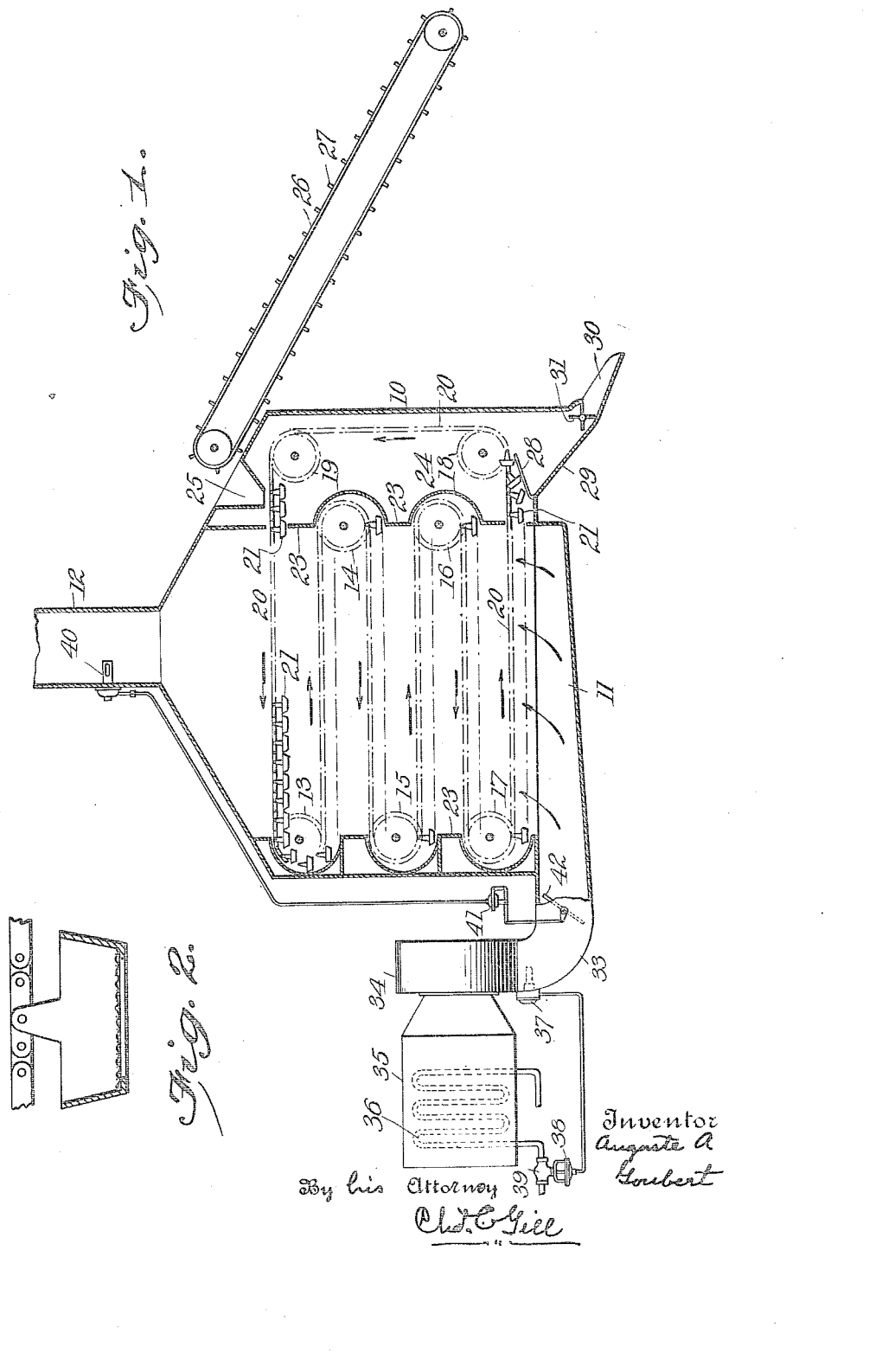

AUGUSTE A. GOUBERT, OF ENGLEWOOD, NEW JERSEY, ASSIGNOR TO HARRY BENTZ, OF MONTCLAIR, NEW JERSEY.

PROCESS FOR DRYING VARIOUS SUBSTANCES.

1,305,599.  Specification of Letters Patent.  Patented June 3, 1919.

Application filed February 28, 1917. Serial No. 151,398.

*To all whom it may concern:*

Be it known that I, AUGUSTE A. GOUBERT, a citizen of the United States, and a resident of Englewood, in the county of Bergen and State of New Jersey, have invented certain new and useful Improvements in Processes for Drying Various Substances, of which the following is a specification.

The invention relates to processes for the drying of vegetable and other material in or reduced to reasonably small pieces, as, for illustration, cossettes, shreds, slices, or the like; and my invention provides a new and highly efficient method or process for the drying of such materials comprising, in the preferred practice, the continuous formation of a substantially uniform layer of the material and the travel thereof back and forth in stretches or sections, one below another in succession, through a drying room from the point of entrance thereto to the point of discharge therefrom, in the presence of air, regulated as to temperature and volume, passing, under requisite pressure, through said room and the successive stretches or sections of said layer of material, the air moving in counter-direction to the travel of said layer and passing through the successive stretches or sections thereof commencing with the driest section or portion of the layer approaching the point of discharge for the material and thence through the successive stretches or sections of the latter toward the point of discharge for the air and the entrance for the constantly added material to keep up the formation of the said layer. The temperature of the heated air entering the drying room should be maintained substantially constant and at a degree suitable to the material under treatment, and this step may be attained automatically with the use of a thermostat. The volume of air admitted to the drying room at a predetermined temperature should be such that the air after having passed through all the stretches or sections of the traveling layer of material will have been lowered to, or nearly to, the temperature of the outside air and its moisture content increased to, or nearly to, the point of saturation at that temperature, and preferably such volume of air may be automatically regulated with the use of a humidostat connected with a valve or damper governing the admission of the air to the drying room.

In carrying out my invention I provide an endless conveyer composed of chains mounted on sprocket wheels and having pivotally suspended from them elongated trays arranged close together and having imperforate sides and ends and coarse mesh wire bottoms, and also means for automatically supplying these trays, as they successively reach a given point with the material to be treated so that there may be a constant supply of the material at one point to maintain the continuity of the layer thereof, while at the point of discharge for the material I provide means for causing the trays to dump their contents—then in dried condition. I also provide means for supplying heated air and moving the same through the drying room and the successive stretches or sections of the traveling layer of material, and also means for automatically controlling the temperature and volume of air admitted to the said room.

The material to be treated will be in its wettest condition at its point of entry to the drying-room and delivery upon the traveling conveyer, and the moisture will gradually be taken from the material as it is carried back and forth in stretches or sections, one below another, to the point of discharge, the hottest air first passing through the driest portion of the material and the air then passing through the material which is in a progressive state of being dried, and which upon approaching the point of discharge, will be subjected to the air entering the room at its predetermined temperature and finally be discharged in dry condition from the room.

An important point of the invention is that the heated entering air which is to effect the drying passes through the successive stretches or sections of the layer of material automatically traveling through the room, commencing with the driest stretch or section and passing thence toward and through the progressively more moist sections of the layer, until finally the air becomes substantially saturated and is discharged from the room.

One object of my invention is to provide not only a thoroughly practical process for the drying of vegetable and other substances, but one of such efficiency that the process may be practised at a minimum expense for heat, power and other requirements.

My invention is admirably adapted for the drying of sugar beets, potatoes and other vegetable substances, which are at present dried in various ways and at an expense which my invention is intended to reduce to a very material extent,—that being one of the purposes of my invention.

An apparatus suitable for carrying my invention into effect is diagrammatically illustrated in the accompanying drawing, in which Figure 1 represents a central vertical section through a drying-room, with accompanying mechanism, all of which will be described in detail hereinafter, and Fig. 2 is a vertical transverse section, on a larger scale, through one of the trays for carrying the material to be treated and having imperforate sides and ends and open mesh bottoms.

In the drawings 10 designates a drying-room which may be, for illustration, about eighty feet long and five or six feet wide, and this room is provided at its bottom with an inlet chamber 11 for heated air and at its top with an outlet 12 for the air after the same has passed upwardly through the room 10 and performed the duty of absorbing moisture from the vegetable or other matter under treatment.

Within the room 10 are mounted upon sprocket wheels 13, 14, 15, 16, 17, 18, 19, a pair of endless chains 20, one being at each side of the room 10, and which sprocket wheels are secured on suitable shafts, one of which may be driven by any suitable power. The sprocket chains 20 may be of any suitable type adapted to travel over the sprocket wheels, and from these chains are pivotally suspended a suitable number, as many as the chains will carry, of transversely elongated trays 21 which are close together and are preferably formed at their sides and ends of sheet metal and at their bottoms of coarse mesh wire cloth.

I do not illustrate the entire chains 20 as equipped with the trays 21, but only show a few of said trays, it being understood that the entire length of the chains will be equipped with said trays arranged close together so as to prevent, as nearly as may be, the upward passage of air between them, the air being thus compelled to pass through the interstices at the bottoms of the trays and through the materials carried within the trays.

At the opposite ends of the room 10 and preferably in vertical line with certain of the sprocket wheels hereinbefore referred to are vertical partitions 23, which are imperforate and serve to confine the air between the stretches or reaches of the chains 20, so that the air may not short circuit around the sprocket wheels and pass at once to the outlet 12.

At one end of the room 10 I locate the sprocket wheels, 18, 19 outwardly beyond the partitions 23, and at this portion of the room 10 is formed a chamber 24 at the top of which the material to be treated is fed to the trays 21 and at the bottom of which the material after having received its treatment is discharged, the process being a continuous one, the material being constantly fed to the trays 21 at the upper end of the chamber 24 and constantly discharged from said trays at the lower end of said chamber. At the upper end of the chamber 24 is provided an inlet chute 25 for the material to be treated, and this material is carried upwardly and discharged into said chute by means of an endless conveyer 26 provided with transverse cleats or the like 27 which serve to maintain the material during its upward travel in a substantially uniform layer, so that the delivery of the material to the chute 25 and trays 21 may be substantially uniform. The conveyer 26 will be driven by any suitable means. At the lower end of the chamber 24 are provided arms 28, one being at each side of the room 10 in the path of the trays 21, and which arms, during the travel of the chains 20, will effect the tilting of said trays so as to discharge their contents upon a chute 29 leading to a discharge 30 controlled by a rotary door or the like 31, the purpose of the door being to permit the discharge of the material dumped from the trays 21 and at the same time prevent the exit of the air at said discharge, it being my purpose that all of the air, or as much thereof as possible, may be compelled to ascend through the bottoms of the trays 21 carried by the several stretches or reaches of the chains 20, as indicated by the lower arrows in the drawing.

The chamber 11 extends transversely the entire width of the room 10 and the entire length of the same up to the chamber 24, and at its inlet end said chamber 11 is in connection by a duct 33 with a suction blower 34, and this blower or fan is at the outlet end of a compartment or box 35 for air and which compartment or box contains a heating coil 36. The coil 36 may be supplied with steam from any suitable source, and the blower or fan 34 serves to draw the air inwardly into the box or compartment 35 and against the heating coil or coils 36 and finally drives the then heated air through the duct 33 and into the chamber 11, whence said air passes upwardly through the perforated bottoms of the trays 21, and finally escapes at the outlet 12. I provide a thermostat 37 at the duct 33 or other suitable point and connect the same as usual with a diaphragm 38 adapted to control the inlet valve 39 for steam to the coils 36, this being for the purpose of automatically maintaining a substantially uniform temperature in the air passing through the duct 33 to the chamber 11. I also provide at the outlet 12 a humidostat 40 of any suitable type, connected with a diaphragm 41 having connection with a valve or damper 42 which controls the passage between the duct 33 and chamber 11. The purpose of the humidostat 40 is to effect an automatic control of the volume of air entering the chamber 11, and consequently entering the room 10, in accordance with the moisture content of the air discharged at the outlet 12, it being my purpose that the air discharged at the outlet 12, after having absorbed moisture from the material carried by the trays 21, shall be as near saturation as possible.

In the employment of the apparatus the material is delivered into the inlet chute 25 and thence passes to the trays 21 traveling below the discharge end of said chute, and said trays are carried continuously by the chains 20 back and forth lengthwise of the room 10, with the heated air passing up through their bottoms and their contents, and said trays at the arms 28 are tilted to discharge their contents upon the outlet chute 29.

My invention will be largely understood from the foregoing description, but since my process is particularly applicable to the drying of vegetable cossettes or vegetable matter in reasonably small pieces, the advantages of the invention when utilized in connection with this particular art may be further understood from the following more specific description:

In the drying of such materials as sugar beet cossettes or potato cossettes, it has been found that if the air is merely flowing over or under the layers of material, such cossettes as are on the surface, dry rapidly, but those in the interior of the mass or those protected from direct impingement remain moist for a much longer time and the time of operation is lengthened to that required by the slower drying parts of the material.

In order to obtain rapid and uniform results, it is necessary that each and all cossettes simultaneously be impinged upon by the current of air. To secure this result, the air of uniform temperature and uniform pressure is blown through layers of uniform thickness. After passing through the first or driest layer, the air goes through the second or next driest; then through the third and so on through successive layers until after passing through the last or wettest, it has arrived at or near the point of saturation.

In order to effect a continuous process, the layers are made to travel in counter direction to the flow of the air without in any way disturbing the material, so that the resistance to the passage of the air remains uniform over the whole area of each layer, securing uniform results and preventing short circuiting of the air current.

The force of the air current also has a tendency to raise each cossette from the one below it, keeping the material in a sort of semi-floating condition and insuring perfect contact of the air with the whole surface of each cossette.

In the treatment of sugar beet cossettes, as an illustration certain cell membranes become injured if subjected to high temperatures and it is therefore necessary that the temperature of the air be maintained at or below a certain predetermined fixed point. Therefore the amount of water to be taken up by the air cannot be regulated by varying the temperature of the incoming air; such control must be in the regulation of the volume brought in contact with the material.

On the other hand, in order to secure maximum efficiency and economy in the use of fuel, it is necessary that the air be caused to take up the maximum quantity of moisture it is capable of holding and be caused to part with as much of its heat as possible to the vaporization of the moisture.

This is accomplished when the air is discharged from the apparatus saturated with moisture and at the temperature of the outside air.

A part of my invention consists in controlling the volume of air admitted at a predetermined temperature so that after passing through the material, it will have been lowered to or nearly to the temperature of the outside air and its moisture content will have been increased to, or nearly to, the point of saturation at that temperature.

The dehydrating of such materials as sugar beet cossettes by subjecting them to the action of heated air, has been tried repeatedly but without success, as it invariably resulted in reducing the commercial value of the article.

It has been found that when the cossettes in their moist state are directly subjected to high heat, the sudden expansion of their water contents destroys the cell walls and injures the product.

In the carrying out of my process, the raw material is first subjected to the action of air of hardly higher temperature than that of the material itself and having very little dehydrating effect.

As the material proceeds through the apparatus, it is progressively subjected to air of greater and greater drying capacity, slowly losing its moisture at comparatively low temperatures, the final drying at the higher degree of heat taking place on the lower layers when but little moisture remains in the cells and there is no further danger of the minor explosions referred to and no destruction of the cells, the dehydrated cossettes retaining their full saccharine value and the colloidal contents of the cells being preserved.

Many modifications of the apparatus hereinbefore described will suggest themselves, and while said apparatus is new, as I believe, I do not desire to limit my invention to the employment of such apparatus. With the apparatus shown the process is carried on as a continuous one, but I do not limit the invention to the carrying on of the process continuously, since said process may be carried on intermittently.

What I claim as my invention and desire to secure by Letters-Patent, is:

1. A process for drying vegetable or other materials, comprising the movement of a substantially uniform layer of the material back and forth within a drying room in successive sections, one below another, from the point of entrance for the material to said room to the point of discharge, and causing the passage of the entire volume of a body of heated air through each of said successive sections commencing with the section adjacent to the point of discharge and thence continuing to the point of outlet for the air.

2. A process for drying vegetable or other materials, comprising the movement of a substantially uniform layer of the material within a drying room in successive sections, one below another, from the point of entrance for the material to said room to the point of discharge, causing the passage of heated air through said successive sections commencing with the section adjacent to the point of discharge and thence continuing to the point of outlet for the air, controlling the temperature of the air at the time of its entrance to the drying room, and controlling the volume of said air entering said room in accordance with the moisture content of the air discharged from the room.

3. A process for drying vegetable or other materials comprising the movement of a substantially uniform layer of the material back and forth within a drying room from the point of entrance for the material to the point of discharge therefrom, said movement progressing longitudinally of said layer feeding the material to maintain said layer and render the process substantially continuous, and causing the entire volume of a body of heated air to pass through each of the successive sections of said layer, commencing with that section of the layer near the discharge for the material.

4. A process for drying vegetable or other materials comprising the movement of a substantially uniform layer of the material within a drying room from the point of entrance for the material to the point of discharge therefrom, feeding the material to maintain said layer and render the process substantially continuous, causing heated air to pass through successive sections of said layer, commencing with that section of the layer near the discharge for the material, controlling the temperature of the air at its time of entrance to said room, and controlling the volume of the air moving through the room in accordance with the degree of saturation of the air leaving the room.

5. A process for drying vegetable or other materials, comprising the movement of the material within a drying room in successive sections, one below another, from the point of entrance for the material to said room to the point of discharge, causing the passage of heated air upwardly through said successive sections commencing with the section adjacent to the point of discharge and thence continuing upwardly to the point of outlet for the air, and so regulating the air pressure as to compel it to keep the drier portions of the material in a somewhat floating condition, thereby to secure the effective drying of each individual piece.

6. A process for drying vegetable or other materials, comprising the movement of the material downwardly in successive sections, one below another, from the point of entrance for the material to the point of discharge, causing the passage of heated air upwardly through said successive sections commencing with the section adjacent to the point of discharge and thence continuing upwardly to the point of outlet for the air, and controlling the volume of air passing through said sections by the degree of saturation of the air leaving the apparatus.

7. The process herein described for the drying of vegetable or other materials in which heated air controlled is caused to pass through successive layers of the material moving in counter direction to the current of air in such manner that while the lower layer is maintained at a uniform predetermined temperature, the air discharged above the upper layer will have a moisture content at or near the point of saturation.

8. A process for drying vegetable or other materials, comprising the movement of a uniform layer of the material within a drying room back and forth in successive sections, one below another, from the upper to the lower portion of the room, and causing the passage of the entire volume of a body of heated air upwardly through each of said successive sections, commencing with the lower section and thence continuing upwardly through the other sections to the point of outlet for the air.

9. A process for drying vegetable or other materials, comprising the movement of a uniform layer of the material within a drying room back and forth in successive sections, one below another, from the upper to the lower portion of the room, causing the passage of heated air upwardly through said successive sections, commencing with the lower section and thence continuing upwardly through the other sections to the point of outlet for the air, and controlling the temperature and volume of the air so that it is substantially saturated after passing through the top one of said sections.

10. The process of drying vegetables and the like, comprising passing the material back and forth in successive sections one above the other and transverse to the direction of a current of drying gas passing through the sections, and transferring the material from one section to the next, the material being continuously supported both while passing through the sections and while being transferred from one to the next and always being free on its upper side.

11. The process of drying vegetables and other material comprising passing the material back and forth in successive sections transverse to the direction of a current of drying gas, passing substantially the entire volume of said current through each of said sections, and transferring the material from one section to the next, the transfer of the material between sections being in a direction counter to the flow of gas.

12. The process of drying vegetables and the like comprising passing a current of air in contact with and in counter direction to the material to be dried, maintaining the air at the point of first contact with said material at a substantially constant elevated temperature above that of the natural air, and varying the volume of flow of the air sufficiently to maintain a substantially uniform high moisture content at the point the air passes out of contact with the material.

13. The process of drying vegetables and the like, comprising passing the material to be dried in contact with and in counter direction to a current of air, maintaining the air at the first point of contact with the material at a substantially constant elevated temperature above that of the natural air, the moisture content per unit weight of the natural air being maintained constant until contact with the material, and varying the volume of flow of the air sufficiently to maintain a substantially uniform high moisture content at the point the air passes out of contact with the material solely by the said variation of flow.

14. The method of drying vegetables and the like comprising passing the material to be dried in contact with and in counter direction to a current of air the entire volume of which is taken from the atmosphere at large and heated to a substantially constant temperature depending upon the material under treatment, and maintaining the moisture content of the outlet air nearly at saturation solely by varying the volume of flow of said current.

Signed at New York city, in the county of New York and State of New York, this 27th day of February, A. D. 1917.

AUGUSTE A. GOUBERT.

Witnesses:
 ARTHUR MARION,
 CHAS. C. GILL.